Patented Oct. 14, 1952

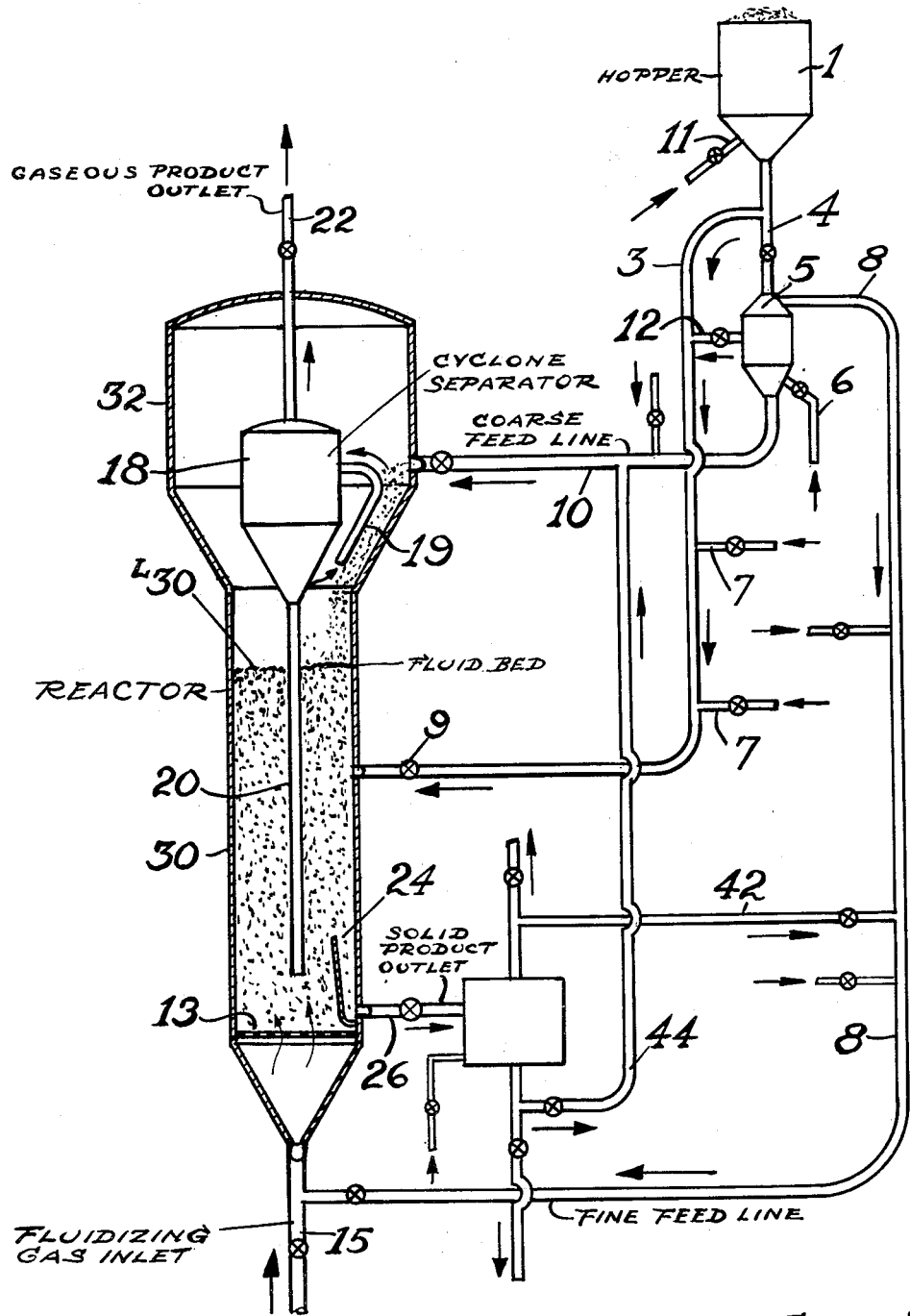

2,614,069

UNITED STATES PATENT OFFICE 2,614,069

CARBONIZING SUBDIVIDED SOLIDS

George L. Matheson, Union, N. J., assignor to Standard Oil Development Company, a corporation of Delaware Application September 19, 1947, Serial No. 774,995

11 Claims. (Cl. 202—6)

The present invention relates to the treatment of subdivided solids. More particularly, the invention pertains to a process of contacting subdivided solids with upflowing gases in an enlarged contacting chamber at a controlled gas flow rate adapted to maintain the subdivided solids in the form of a highly turbulent ebullient mass resembling a boiling liquid.

Prior to the present invention, subdivided solids have been contacted with gases by passing the latter upwardly through an enlarged contacting zone containing a body of the subdivided solids and controlling the superficial gas velocity in such a manner as to maintain the solids in a quasi-liquid or fluidized state within the contacting zone. This quasi-liquid fluidized state involves a rapid circulation of the subdivided solids in all conceivable directions throughout the fluidized bed.

The advantages of processes using this type of fluidized solids are great in number and importance. For example, the contact between gases and solids, as well as between individual solid particles, is considerably improved as compared with other types of operation. A substantially uniform temperature may be maintained throughout a fluidized bed of subdivided solids because of the rapid circulation and high turbulence of the solids within the bed which result in an extremely efficient transfer of heat from particle to particle and between different sections of the bed. For the same reasons heat may be added to, or extracted from a fluidized solids bed with the greatest of ease and speed.

Fluid operations of the character described above have been employed for many processes included reduction and oxidation reactions, polymerization processes, the carbonization or gasification of carbonaceous solids, such as coal or the like, and a large number of other exothermic and endothermic reactions. More specifically, successful use of the fluid solids technique has been made in various petroleum oil refining processes, such as catalytic cracking, reforming, hydrogenating and similar operations, as well as in the catalytic synthesis of hydrocarbons from carbon monoxide and hydrogen. However, while the application of subdivided solids in the form of fluidized beds has found extensive uses, there are certain inherent limitations in this technique which have prevented its adaptation in some fields and limited its efficiency in others.

One of the more serious limitations of the fluid solids technique results from the fact that proper fluidization is bound to a definite particle size or particle size distribution for any given superficial velocity or range of superficial velocity of the fluidizing gas. For example, some materials may be properly fluidized at a superficial gas velocity of, say, about 0.1 to 3 feet per second and a particle size distribution ranging from about 30 to 200 microns. Particles considerably larger than the size range indicated will tend to settle out of the fluidized bed and particles considerably smaller than the indicated range will be carried to and beyond the top of the bed by the fluidizing gas, thus, destroying the particle size distribution desirable for proper fluidization at the prevailing gas velocity. Neither the unduly large settled particles nor the unduly small entrained particles may derive the full benefit from the advantageous characteristics of the fluidized bed. This situation becomes particularly troublesome when it is desired to form fluidized solids beds of materials which are naturally occurring or artificially produced in the form of subdivided particles whose size spreads over a wide range.

For example, many types of waste coal are obtained in the course of conventional coal mining processes in the form of masses composed of particles varying in size from a few microns to as much as 5, 10 or more millimeters. When masses of this type are treated in fluid carbonization or gasification units with fluidizing gases or gasifying media, such as steam, carbon dioxide, oxygen-containing gases, or the like, the superficial velocity of the fluidizing gas is usually controlled at about 1.0 to 3 feet per second at which proper fluidization of the bulk of the coal particles having particle size distributions within the approximate range of from about $\frac{1}{10}$ to 5 millimeters may be accomplished. However, under these conditions coal particles having a particle size of substantially more than 5 millimeters, say, up to about 10 to 15 millimeters settle out of the fluidized bed and coal particles considerably smaller than $\frac{1}{5}$ of a millimeter, say, of about 10 to 150 microns are blown out of the fluidized bed by the fluidizing gas. In addition, when fluidization is continued over a substantial length of time, a tendency develops toward a separation of particles having sizes within the upper originally fluidizable brackets of, say, about 2 to 5 millimeters from particles having sizes within the lower originally fluidizable brackets of about $\frac{1}{10}$ to 1 millimeter. As a result, substantial proportions of the coal feed, which may amount to as much as 10–30%, are lost either completely or to the desired treatment at optimum conditions. In addition, the superficial gas velocity of the fluidizing gas must be continuously checked and readjusted in order to compensate for the continuous shift in particle size distribution.

Similar difficulties arise in various catalytic processes involving a significant change of a catalyst particle size during the catalytic reaction. An outstanding example for such processes is the synthesis of hydrocarbons from carbon monoxide and hydrogen employing fluidized iron-type catalysts at temperatures of about 500°–700° F. and pressures of about 50–50 atmospheres. It is well known that iron-type synthesis catalysts at these conditions have a strong tendency to carbonize, that is to form catalyst deposits of free carbon or coke-like materials. In fluid operation, carbonization leads to a rapid disintegration of the catalyst resulting in an equally rapid expansion and the ultimate loss of the catalyst bed in the form of catalyst fines entrained in the gaseous reaction products. It has been suggested to alleviate these difficulties by continuously or intermittently feeding fresh or regenerated coarse catalyst to the reaction zone in order to establish a particle size distribution desirable for proper fluidization. However, the above mentioned tendency of the particles of different size to classify, is not avoided in this manner.

The present invention overcomes the aforementioned difficulties and affords various additional advantages. These advantages, the nature of the invention and the manner in which it is carried out will be fully understood from the following description thereof read with reference to the accompanying drawing.

It is the principal object of the present invention to provide improved means for maintaining proper fluidization conditions within a fluidized bed of subdivided solids having particle sizes spreading over a wide range.

A more specific object of the present invention is to provide means for maintaining a desirable particle size distribution within a fluidized bed of subdivided solids having particle sizes spread over a wide range.

Other and more specific objects and advantages of the invention will appear hereinafter.

In accordance with the present invention, these objects and advantages may be accomplished, quite generally, by supplying to a fluidized bed of subdivided solids comprising component particles having a tendency to move in one vertical direction at the fluidization conditions, such particles as have a tendency to move in an opposite direction and selecting the point of this particles supply and substantially removed from the center of the fluidized bed in the direction of the motion of said component particles. In other words, the invention provides for supplying to a fluidized bed of solids comprising particles large enough to sink to the bottom of the fluidized bed at the prevailing fluidization conditions and/or particles small enough to rise at least to the top of the fluidized bed at the prevailing fluidization conditions, a fraction consisting preponderantly of particles of said large size to an upper portion of the fluidized bed and/or a fraction consisting preponderantly of particles of said small size to a lower portion of the fluidized bed. By this means, the small particles tending to rise upwardly through the fluidized bed encounter an excess of coarse particles and the large particles tending to sink to the bottom of the fluidized bed encounter an excess of small particles in their respective directions of classification so as to establish the particle size distribution adequate for proper fluidization within the center as well as within the top and bottom portions of the fluidized mass. In this manner, classification of particles varying greatly in size within the fluidized bed as well as an undesired removal of small and large particles from the fluidized bed may be substantially reduced or completely eliminated.

More specifically, in processes involving the continuous or intermittent feed to a fluidized solids bed, of a subdivided solids charge varying in particle size over a wide range, the charge, in accordance with the present invention, is divided into at least 2 fractions which differ greatly in average particle size. A fraction comprising predominantly particles of the lowest size ranges is fed to a bottom portion of the fluidized bed while a fraction comprising predominantly particles of the highest size ranges is fed to an upper portion of the fluidized bed. Fractions composed predominantly of particles of intermediate size or having substantially the composition of the unfractionated charge material may be fed to intermediate sections of the bed, if desired. This procedure is particularly suitable for the treatment of carbonaceous solids such as coal, lignite, peat, oil shale, tar sands, coke, oil coke, cellulosic materials including lignin, etc., which are obtained from natural or artificial sources or specifically prepared for the purpose in the form of subdivided masses, the particle size of which spreads over wide ranges.

When applied to processes involving a change of particle size during the treatment of solids in a fluidized bed, the objects of the invention may be accomplished by feeding the solid undergoing treatment either in a relatively small particle size to a lower portion of the fluid solids bed or in a relatively large particle size to an upper portion of the fluid solids bed depending on whether the change of particle size taking place within the bed is of the type of disintegration or enlargement. An example for this application of the invention is the catalytic synthesis of hydrocarbon from carbon monoxide and hydrogen over iron catalysts, mentioned above. When catalyst disintegration begins adversely to affect fluidization conditions, fresh or regenerated catalyst of a particle size, substantially larger than the fines formed by disintegration, is charged to the upper portions of the fluidized bed in proportions adequate to maintain a suitable particle size distribution throughout the bed.

It will be appreciated that the absolute and relative amounts of subdivided particles of relatively large and relatively small particle size to be supplied to fluidized solids beds in accordance with the invention will vary widely as a function mainly of the character of the solids involved, particularly their specific gravity, and the character and velocity of the gases used for fluidization and/or reaction. It may be stated, however, quite generally, that proper fluidization may be obtained when the proportion of solid particles fully entrainable in the fluidizing gas at the prevailing superficial gas velocity amounts to about 30% to 50% by weight of the fluidized bed, the proportion of particles having a strong settling tendency at the prevailing superficial gas velocity amounts to about 0% to 30% by weight of the fluidized bed, and the proportion of particles of intermediate size amounts to about 20% to 70% by weight of the fluidized bed. The supply of solids fractions of extremely large or extremely small particle size, in the manner described above, should be so controlled that the particle size distribution throughout the fluidized bed is maintained within these ranges.

Having set forth its objects and general nature, the invention will be best understood from the more detailed description hereinafter in which reference will be made to the accompanying drawing which is a schematical illustration of a system suitable for carrying out a preferred embodiment of the invention.

Referring now in detail to the drawing, the system illustrated therein essentially comprises solids feeding equipment 1, 5, and a conventional fluid solids reactor 30, the functions and cooperation of which will be presently explained using the carbonization of subdivided coal as an example. However, it should be understood that other subdivided solids may be treated in a substantially analogous manner.

In operation, feed hopper 1 contains a coal charge which may be subdivided waste coal having a particle size of less than ⅜ of an inch. Large amounts of coal waste of this character are obtained in the conventional processing of coal at the mines. These coal wastes may have a particle size distribution about as follows:

| | Per cent |
|---|---|
| ⅜" to 4 mesh | 25 |
| 4 to 14 mesh | 45 |
| 14 to 48 mesh | 19 |
| 48 to 100 mesh | 4 |
| Minus 100 mesh | 7 |

A portion of about 20% to 60% of the total coal feed desired to be supplied to reactor 30 may be withdrawn from feed hopper 1 and passed by any suitable conveying means, such as a screw conveyor, lock hopper, or a standpipe 3, provided with aeration taps 7 and slide valve 9 to reactor 30. If desired, the coal in hopper 1 may be preheated with gases from the process supplied through line 11, to temperatures of about 200° to 600° F. which lie below the carbonization, plastic and ignition temperatures of the coal. If no coal preheating is desired, a fluidizing gas, such as steam, flue gas, air, etc., may be introduced through line 2 to facilitate the flow of the coal particles. A similar fluidizing gas may be injected, in small amounts, through taps 7 into standpipe 3 to maintain the fluid character of the solids column therein.

The fluidized coal is forced under the pseudo-hydrostatic pressure of standpipe 3, at a rate controlled by slide valve 9, into reactor 30 wherein it forms above distributing grid 13 a dense turbulent mass of coal particles fluidized by the volatile carbonization products and a gas injected through line 15 below grid 13. Superficial gas velocities of about 0.3 to 4 feet per second within reactor 30 are generally suitable for this purpose. The carbonization temperature in reactor 30 may be selected exclusively with a view to the type and quantity of volatile carbonization products desired and may vary within the wide limits of about 800° to 2000° F. The lower temperatures within said range are conducive to the formation of relatively large quantities of low temperature tar and light oils while at the higher temperatures more coal gas and hydrogenation products are formed.

The heat required to maintain the desired carbonization temperature may be supplied in any conventional manner, for instance indirectly or as sensible heat of the gas introduced through line 15, or by an exothermic reaction within reactor 30, such as a limited combustion of coal constituents, or by the circulation of externally heated char. Superheated steam, hot flue or product gases, or the like are preferred heating gases in the case of low temperature carbonization. When the carbonization is conducted above temperatures of about 1000° F., air and/or oxygen preheated to about 600° to 800° F. may be used in amounts sufficient to generate, by combustion, the heat required for carbonization. About 0.3 to 1.0 pound of air per pound of coal is normally adequate for this purpose, the exact proportion depending on the character of the coal, the degree of preheat and the temperature desired.

Volatile carbonization products are withdrawn overhead from level $L_{30}$ and passed through a conventional gas-solids separator 18 provided with a solids return line 20 leading, in accordance with the invention, to a lower portion of the fluidized bed within reactor 30. In order to reduce entrainment of solid particles in the product gases and vapors to a deirable minimum, the top section of reactor 30 may be of enlarged cross-section as indicated at 32 so as to bring about a significant reduction in superficial gas velocity. However, entrainment of coal fines may not be completely avoided in this manner. A substantial proportion of the coal fines entrained in the volatile carbonization products are separated in separator 18 and returned through line 20 to the bottom portion of reactor 30 to aid in the maintenance of a proper particle size distribution in accordance with the invention. Separator 18 may also be arranged down-stream of some conventional cooling means outside reactor 30, if the high temperatures of reactor 30 make this appear more advisable. Vaporous and gaseous carbonization products, now substantially free of entrained coal particles, may be removed through line 22 and passed to a conventional product recovery system (not shown). Substantially "dry" coke may be withdrawn downwardly from carbonizer 30 through a withdrawal well 24 and line 26 for any desired use.

At the conditions of temperature and gas velocity specified above and when using a large diameter, relatively shallow fluidized bed, say having a depth equal to its diameter, or less, a coal particle size distribution suitable for proper fluidization within reactor 30 may, for example, be about as follows:

| | Weight per cent |
|---|---|
| 1.5 to 5 millimeters | 0.1 to 1 |
| 0.5 to 1.5 millimeters | 20 to 25 |
| 200 to 500 microns | 50 to 60 |
| 100 to 200 microns | 5 to 15 |
| 50 to 100 microns | 5 to 10 |
| <50 microns | 2 to 5 |

In conventional operation, the fluidized coal mass in reactor 30 will tend to classify the particles having a particle size of less than about 200 microns concentrating in the upper portion of the bed and the particles having a particle size larger than 1 millimeter concentrating in the lower portion of the bed depending on the gas velocity employed. This classification leads to serious fluidization troubles resulting in irregularities of the temperature throughout the bed and the treating intensity within different sections of the bed. A considerable improvement is afforded by the recirculation of coal fines of less than about 200 microns size entrained in the product vapors and gases and separated in separator 18, to a lower portion of the fluidized bed through line 20. The amount of coal fines so recirculated may be about 100 to 10,000 weight percent of the total coal fed to reactor 30, depending on the fines concentration and feed rate of the original coal feed.

The higher rates of solids flow through the cyclone and down to the bottom of the bed may be facilitated by extending the inlet to the cyclone, which may be a pipe 19, downwardly to within a short distance, say about 2 to 6 feet, from the top of the bed. The reasons for this effect are twofold. It is known that the efficiency of cyclone separators increases to a certain extent as the solids load of the cyclone increases from very low levels. In addition, it has been found that the concentration of solids entrainment per cubic foot of gas decreases as the gas moves away from the upper level of the fluidized bed. For example, when using a solid material having a density of about 1.0 at a superficial linear gas velocity of about 1.4 feet per second, the solids entrainment of the gas at a distance of 1 foot above the level may be about 0.1 pound per cubic foot while at 10 feet above the level it may drop to about 0.003 pound per cubic foot.

However, there may still remain a classification of relatively large and relatively small particles, which are not removed with the carbonization products or recycled to the lower portions of the fluidized bed through line 20. In order to eliminate fluidization troubles which may result from this further classification, the invention provides for a separate feed of relatively coarse and relatively fine coal particles to the fluidized bed in opposite directions. For this purpose, a proportion of about 40% to 80% of the total coal charge to be supplied to reactor 30 is withdrawn from feed hopper 1 and passed through line 4 to a conventional classification means, such as an elutriation system 5 wherein the coal may be classified into two or more fractions of different average particle size. An elutriation gas may be supplied to the bottom of elutriator 5 through line 6. Other conventional classification means, such as suitable sieving means, may be used.

A coal fraction comprising predominantly particles having a particle size smaller than 200 microns may be taken overhead from elutriator 5 and passed through line 8 to a bottom portion of reactor 30, if desired via fluidizing gas feed line 15 and grid 13. In continuous operation, this fraction of coal particles may amount to about 5% to 50% by weight of the coal supplied to elutriator 5.

Another coal fraction comprising predominantly coal particles larger than 0.5 millimeter may be withdrawn from the bottom of elutriator 5 and passed through line 10 to the top of reactor 30. This fraction may amount to about 50% to 95% by weight of the coal charged to elutriator 5. If desired, a third fraction of intermediate particle size may be withdrawn from elutriator 5 through line 12 to be united with the coal charged through line 7.

The product drawn off through line 26 may be classified in a suitable conventional device such as an elutriator or sieve 40 and at least a portion of the fines returned through lines 42 and 8 to the fluid bed, thereby keeping the concentration of the fines in the reactor at a high level. This high concentration of fines greatly improves the fluidity of the bed. The retention of the fines within the system in this manner causes the particle size distribution within the reactor to have little resemblance to the particle size distribution of the feed. In certain cases it may also be desirable to return at least a portion of the coarse solid product separated in classifier 40, through lines 44 and 10 to reactor 30.

It will be readily appreciated from the above description of the drawing that the recirculation of coal fines and particularly the split feed of coal fractions of widely differing average particle size, in accordance with the present invention, counteract efficiently the natural classification tendencies of the fluidized bed and permit the maintenance of proper fluidization conditions without careful control and readjustment of the superficial gas velocity.

While reactor 30 and its operation have been described with reference to the carbonization of coal, it will be understood that other carbonizable solids, such as oil shale or cellulosic materials, may be treated substantially as described. The system may also be used for the gasification of carbonaceous solids with gasifying media, such as steam and/or carbon dioxide, by suppling the gasifying medium through line 15 and maintaining a gasification temperature of, say, about 1500° to 2000° F. within reactor 30. The invention, as described with reference to the drawing, may be applied to other processes involving the use of fluidized solids, such as catalytic reactions, in a generally analogous manner, catalyst or other solids used in the process being supplied in suitable particle size ranges through lines 8, 9, and/or 10 as required by the classification tendency of the solids mass maintained within reactor 30.

While the foregoing description and exemplary operations have served to illustrate specific applications and results of the invention, other modifications obvious to those skilled in the art are within the scope of the invention. Only such limitations should be imposed on the invention as are indicated in the appended claims.

I claim:

1. In the method of carbonizing subdivided carbonaceous solids in the form of a dense turbulent mass fluidized by an upwardly flowing gas to form a well defined upper interface and comprising component particles readily entrainable in said gas at the fluidization conditions and other component particles tending to settle out of the fluidized mass at the fluidization conditions, the improvement which comprises supplying readily entrainable particles to a lower portion of said mass, supplying particles having a settling tendency to an upper portion of said mass so as to maintain a substantially uniform particle size distribution throughout said mass, withdrawing solids having said particle size distribution from a lower portion of said mass, separating entrainable particles from said withdrawn solids and returning at least a portion of said separated particles to a lower portion of said mass.

2. The method of claim 1 in which said mass contains about 30–50% by weight of said readily entrainable particles, not more than about 30% by weight of said particles having a settling tendency and about 20–70% by weight of particles of intermediate buoyancy.

3. The method of claim 1 in which readily entrainable particles entrained in said gas leaving said bed are separated from said gas and supplied to a lower portion of said mass.

4. The method of claim 3 in which the solids concentration of said gas from which said entrained particles are separated is that prevailing above said interface in close proximity to said bed.

5. In the method of carbonizing subdivided carbonaceous solids in the form of a dense turbulent mass fluidized by an upwardly flowing gas to form a well defined upper interface and comprising component particles readily entrainable in said gas at the fluidization conditions and other component particles tending to settle out of the fluidized mass at the fluidization conditions, the improvement which comprises supplying readily entrainable particles to a lower portion of said mass, supplying particles having a settling tendency to an upper portion of said mass so as to maintain a substantially uniform particle size distribution throughout said mass, withdrawing solids having said particle size distribution from a lower portion of said mass, separating particles having a settling tendency from said withdrawn solids and returning at least a portion of said separated solids to an upper portion of said mass.

6. The method of claim 5 in which said mass contains about 30-50% by weight of said readily entrainable particles, not more than about 30% by weight of said particles having a settling tendency and about 20-70% by weight of particles of intermediate buoyancy.

7. The method of claim 5 in which readily entrainable particles entrained in said gas leaving said bed are separated from said gas and supplied to a lower portion of said mass.

8. The method of claim 7 in which the solids concentration of said gas from which said entrained particles are separated is that prevailing above said interface in close proximity to said bed.

9. In the method of carbonizing a mass of subdivided carbonaceous solids composed of particles spreading over a wide range of particle sizes in the form of a dense turbulent bed of subdivided solids fluidized by an upwardly flowing gas to form a well defined upper interface, the improvement which comprises withdrawing from said bed solids having the average particle size distribution of said bed, separating from said withdrawn solids a solids fraction consisting predominantly of particles large enough to tend to concentrate in the bottom of said bed at the prevailing fluidization conditions, separating from said withdrawn solids a solids fraction consisting predominantly of particles small enough to tend to concentrate in the top of said bed at the prevailing fluidization conditions, feeding said first-named fraction to an upper portion of said bed and feeding said second-named fraction to a lower portion of said bed so as to maintain a substantially uniform particle size distribution throughout said bed.

10. The method of claim 9 in which said fraction of relatively large particle size amounts to not more than about 30% by weight and said fraction of relatively small particle size to about 30-50% by weight, of said bed.

11. The process of claim 10 in which said bed contains about 20-70% by weight of solids of an intermediate particle size.

GEORGE L. MATHESON.

REFERENCES CITED

The following references are of record in the file of this patent:

UNITED STATES PATENTS

| Number | Name | Date |
| --- | --- | --- |
| 1,027,290 | Smith | May 21, 1912 |
| 2,325,136 | Kassel | July 27, 1943 |
| 2,325,611 | Keranen | Aug. 3, 1943 |
| 2,373,008 | Becker | Apr. 3, 1945 |
| 2,409,476 | Creelman et al. | Oct. 15, 1946 |
| 2,432,135 | Barr | Dec. 9, 1947 |
| 2,451,619 | Hengstebeck et al. | Oct. 19, 1948 |
| 2,455,915 | Borcherding | Dec. 14, 1948 |
| 2,480,670 | Peck | Aug. 30, 1949 |

FOREIGN PATENTS

| Number | Country | Date |
| --- | --- | --- |
| 585,354 | Great Britain | Feb. 5, 1947 |
| 586,992 | Great Britain | Apr. 10, 1947 |